No. 702,747. Patented June 17, 1902.
F. SAXON.
COG WHEEL.
(Application filed Feb. 8, 1902.)
(No Model.)
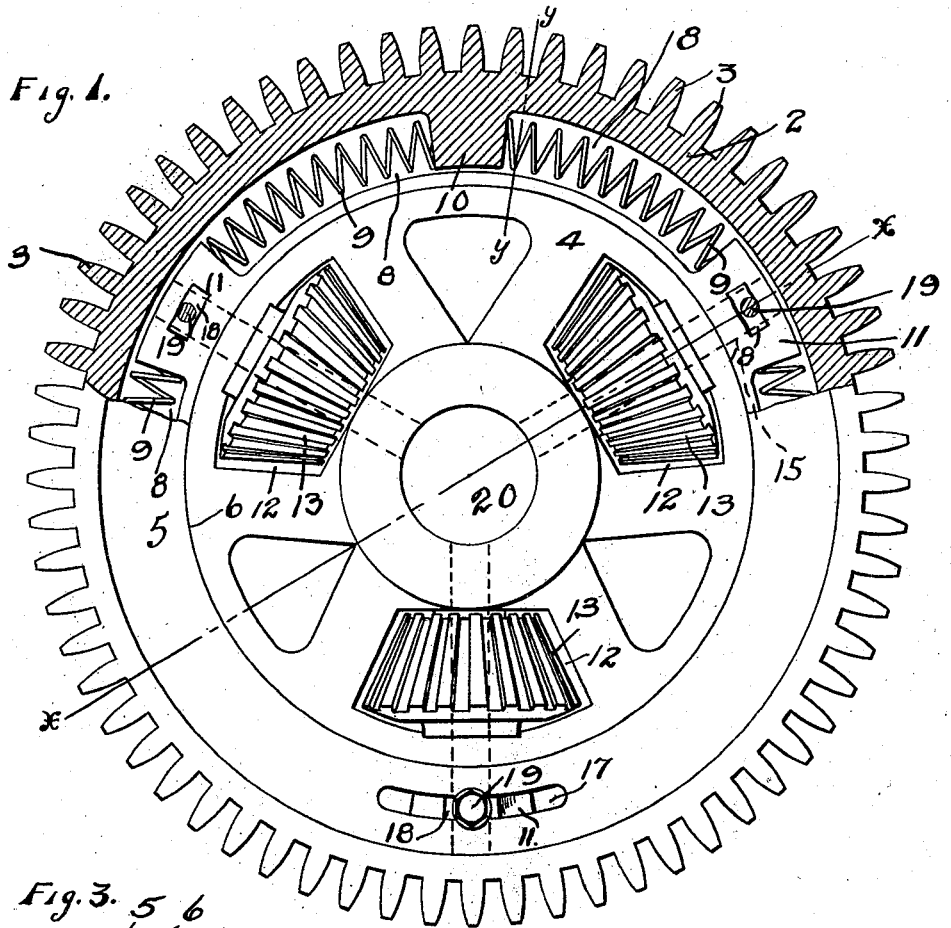
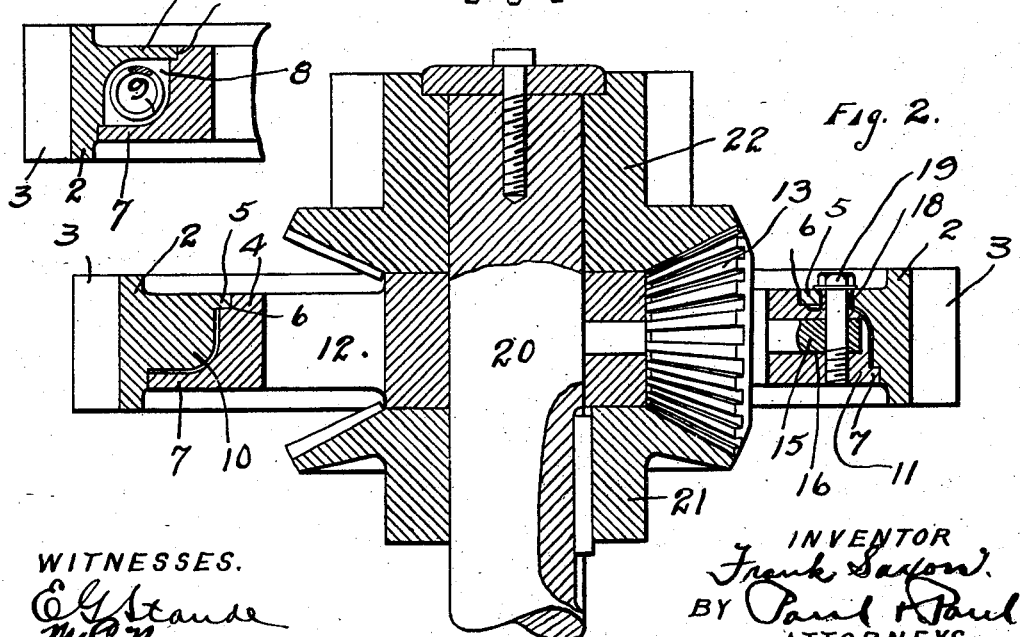
WITNESSES.
INVENTOR
Frank Saxon.
BY
ATTORNEYS.
THE NORRIS PETERS CO., PHOTO-LITHO., WASHINGTON, D. C.

UNITED STATES PATENT OFFICE.

FRANK SAXON, OF WORTHINGTON, MINNESOTA.

COG-WHEEL.

SPECIFICATION forming part of Letters Patent No. 702,747, dated June 17, 1902.

Application filed February 8, 1902. Serial No. 93,128. (No model.)

*To all whom it may concern:*

Be it known that I, FRANK SAXON, of Worthington, in the county of Nobles and State of Minnesota, have invented a certain new and useful Improvement in Cog-Wheels, of which the following is a specification.

My invention relates to cog-wheels, and is designed as an improvement over the device shown and described in Letters Patent of the United States granted to me November 29, 1892, Serial No. 487,129.

The object of the invention is to simplify and improve the manner of fitting and securing the two members of the wheel together.

A further object is to provide means for limiting the relative movement of the members to prevent possible breakage of the springs, and, further, to provide improved means for supporting and securing the pinions within the inner member.

The invention consists generally in various constructions and combinations, all as hereinafter described, and particularly pointed out in the claims.

In the accompanying drawings, forming part of this specification, Figure 1 is a side elevation of a cog-wheel embodying my invention, the upper portion thereof being in section, showing the arrangement of the springs between the two members. Fig. 2 is a section on the line $x\ x$ of Fig. 1. Fig. 3 is a section on the line $y\ y$ of Fig. 1.

In the drawings, 2 represents the outer section, having cogs 3, and 4 the inner section fitted within the outer and secured upon or loosely mounted on a shaft. The outer section is provided with an inwardly-extending annular flange 5, fitting a recess 6 in the inner section, which has an outwardly-extending annular flange 7 to enter a recess in the outer section. These flanges and recesses are easily turned out of the sections of the wheel and fit together with comparatively little adjustment and attention to detail, which were found to be necessary in the manufacture of the wheel described in my former patent. Between the flanges 5 and 7 chambers 8 are formed, within which I provide coil-springs 9 between lugs 10 on the outer section and corresponding lugs 11 on the inner section. These springs are adapted to yield longitudinally and take up the shock of a sudden starting or stopping of the machinery. For instance, if the inner section be secured upon a shaft and power be suddenly applied thereto the force will be yieldingly transmitted to the other section and prevent any sudden or unusual strain thereon. When the device is used as a compensating gear, the inner member is provided with recesses 12, wherein beveled pinions 13 are arranged and mounted upon pins 15, that are removably fitted within radial holes 16 in the lugs 11 and in a hub of the inner section. The outer section over the lugs 11 is provided with curved slots 17 to receive studs 18 on said lugs, and bolts 19, passing down through said studs and said lugs, secure the pins 15 therein. The travel of the inner section with respect to the outer is regulated by the length of the slots 17, which prevents undue compression and possible breakage of the springs. I prefer to provide the studs 18 to relieve the bolts as much as possible of the strain when coming in contact with the ends of the slots.

20 represents a shaft whereon the inner member is loosely mounted, 21 a pinion secured on said shaft and engaging the pinions 13, and 22 a pinion corresponding to the pinion 21, but loosely mounted on the shaft on the opposite side of the wheel. This pinion 22 also engages the pinions 13.

In operation when the cog-wheel is revolved motion is transmitted through the pinions 13 to the pinions 21 and 22 upon the shaft. When the device is applied to a traction-engine, the pinions 13 and 22 will be revolved in making a turn to compensate for the difference in speed between the road-wheels with which the pinion 22 engages and the shaft 20.

The advantages of this construction over that shown in my former patent are, first, the improved means for fitting and securing the members of the wheel together; second, the manner of supporting the pinions 13, which permits their convenient insertion or removal, and, third, the devices for limiting the relative movement of the two members to prevent undue compression of and strain on the cushion-springs.

I claim as my invention—

1. A compensating cog-wheel, comprising an outer section having a series of teeth and an annular inwardly-projecting flange on one side, an inner section fitting within said outer section and having a corresponding outwardly-projecting flange on the opposite side from said first-named flange between which flanges chambers are formed, inwardly and outwardly projecting lugs provided respectively on said sections, and cushion-springs provided between the lugs of each section and the adjacent lugs of the other section.

2. A compensating cog-wheel, comprising an outer section having a series of teeth and a series of inwardly-projecting lugs, an inner section fitting within said outer section and having a series of outwardly-projecting lugs alternating with those of the outer section, a series of cushion-springs provided between the lugs of one section and the adjacent lugs of the other section, beveled pinions provided within recesses in said inner section, and radial pins passing through the lugs and hub of said inner section and whereon said pinions are mounted.

3. A compensating cog-wheel, comprising an outer section having a series of teeth and a series of inwardly-projecting lugs, an inner section arranged within said outer section and having a series of lugs alternating with the lugs of the outer section, springs provided between the lugs of said sections and adapted to be compressed by the relative rotary movement of the same, and studs provided on the lugs of the inner section and adapted to travel within slots in the face of the outer section and regulate the travel of said sections and the compression of said springs.

4. A compensating cog-wheel, comprising an outer section having a series of teeth and a series of inwardly-projecting lugs, an inner section fitting within said outer section and having a series of lugs alternating with the lugs of the outer section, cushion-springs provided between the lugs of said sections and adapted to be compressed by the relative rotary movement of the same, pinions provided within recesses in said inner section, radial pins passing through the lugs and hub of said inner section and whereon said pinions are mounted, and bolts adapted to travel in slots provided in said outer section and passing through the lugs and pins of said inner section and whereby the relative movement of said sections and the compression of said springs is regulated.

In witness whereof I have hereunto set my hand this 30th day of January, 1902.

FRANK SAXON.

In presence of—
  PETER THOMPSON,
  S. KINDLUND.